United States Patent
Vainikainen et al.

(12)

(10) Patent No.: US 6,748,000 B1
(45) Date of Patent: Jun. 8, 2004

(54) APPARATUS, AND AN ASSOCIATED METHOD, FOR COMPENSATING FOR VARIABLE DELAY OF A PACKET DATA IN A PACKET DATA COMMUNICATION SYSTEM

(75) Inventors: Jorma Vainikainen, Tampere (FI); Janne Kallio, Ylöjärvi (FI)

(73) Assignee: Nokia Networks, Mountain View, CA (US)

( * ) Notice: Subject to any disclaimer, the term of this patent is extended or adjusted under 35 U.S.C. 154(b) by 465 days.

(21) Appl. No.: 09/672,752

(22) Filed: Sep. 28, 2000

(51) Int. Cl.[7] .................................................. H04J 3/06
(52) U.S. Cl. ........................................ 370/517; 370/428
(58) Field of Search ................................. 370/428, 516, 370/517, 352, 353, 354, 355, 356; 375/371, 372

(56) References Cited

U.S. PATENT DOCUMENTS

| | | | | |
|---|---|---|---|---|
| 4,538,259 A | * | 8/1985 | Moore ......................... | 370/519 |
| 4,607,363 A | * | 8/1986 | Platel et al. ................. | 370/230 |
| 4,914,650 A | * | 4/1990 | Sriram ......................... | 370/528 |
| 5,130,985 A | | 7/1992 | Kondo et al. ................ | 370/400 |
| 5,287,347 A | * | 2/1994 | Spanke ......................... | 370/235 |
| 5,406,559 A | * | 4/1995 | Edem et al. ................. | 370/516 |
| 5,623,483 A | | 4/1997 | Agrawal et al. ............. | 370/253 |
| 6,075,798 A | * | 6/2000 | Lyons et al. ................. | 370/521 |
| 6,259,691 B1 | * | 7/2001 | Naudus ......................... | 370/526 |
| 6,389,032 B1 | * | 5/2002 | Cohen .......................... | 370/516 |

* cited by examiner

*Primary Examiner*—Chi Pham
*Assistant Examiner*—Keith M. George
(74) *Attorney, Agent, or Firm*—Brown Raysman Millstein Felder and Steiner

(57) ABSTRACT

Apparatus, and an associated method, for compensating for variable delays in the communication of packet data to a receiving station during, for example, a VOIP (Voice-Over-Internet Protocol) communication session. Compensation is made for surges of data received at the receiving station subsequent to a congestion condition. A jitter buffer and a trimming buffer are both utilized to buffer data packets thereat. The data buffered at the trimming buffer is selectably trimmed in a manner to permit the informational content of the data received at the receiving station to be recovered without introducing significant delay times in the recovery of the informational content.

18 Claims, 4 Drawing Sheets

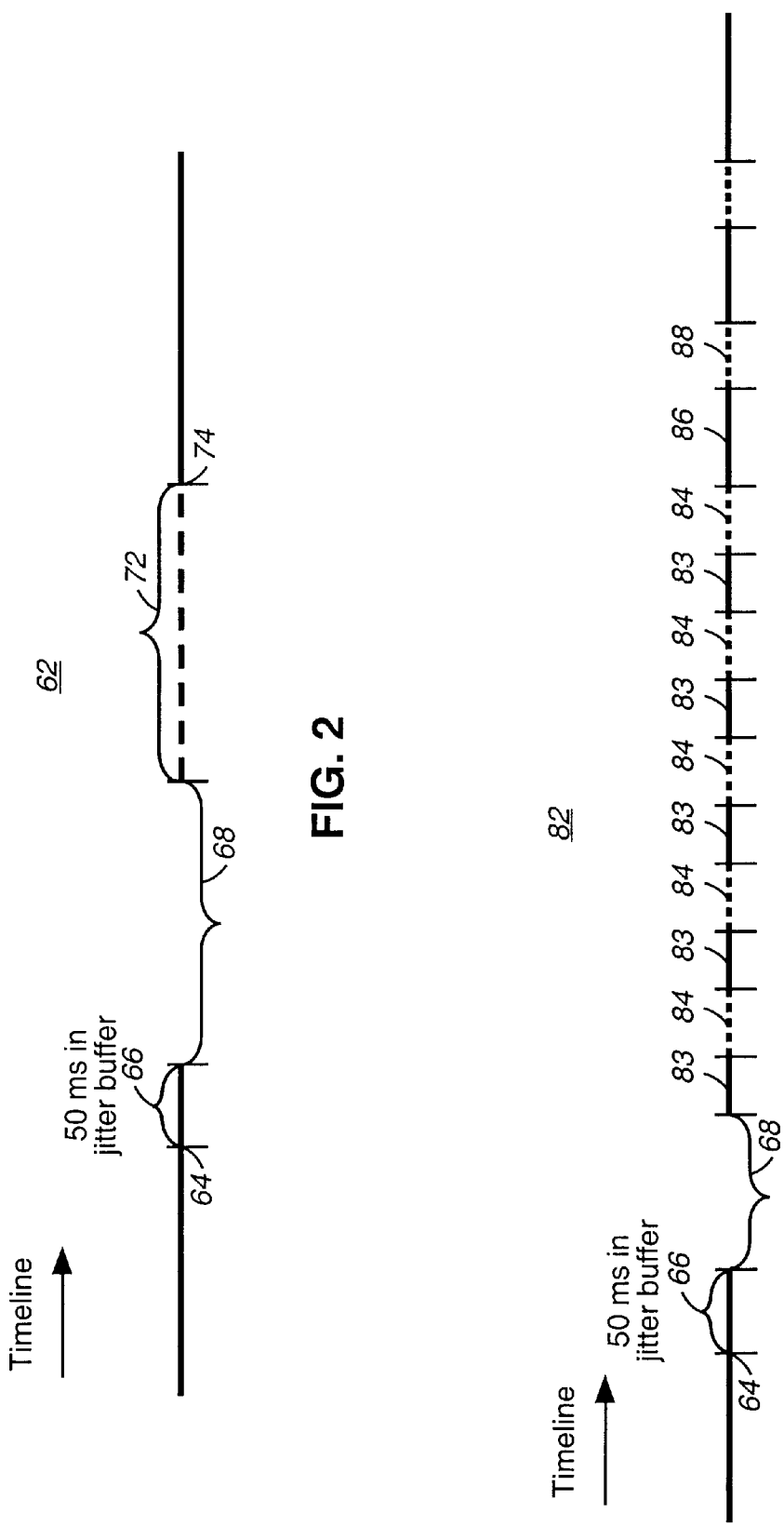

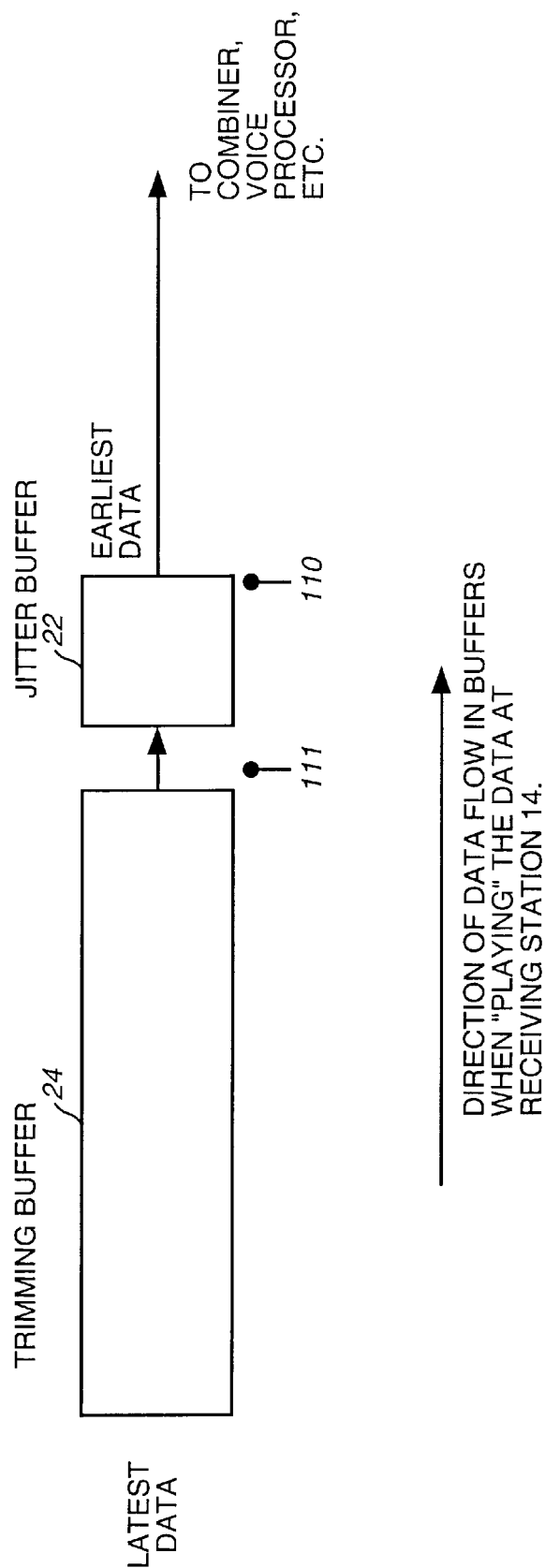

APPARATUS, AND AN ASSOCIATED METHOD, FOR COMPENSATING FOR VARIABLE DELAY OF A PACKET DATA IN A PACKET DATA COMMUNICATION SYSTEM

The present invention relates generally to a manner by which to communicate data in a packet communication system in which a communication channel exhibits variable delay. More particularly, the present invention relates to apparatus, and an associated method, by which to compensate for the variable delay introduced upon the data during communication of the data to a receiving station. A trimming buffer is utilized to buffer data. Selected portions of the data buffered at the trimming buffer are trimmed to reduce data delay but in a manner to maintain acceptable communication quality levels.

BACKGROUND OF THE INVENTION

Advancements in communication technologies have permitted the introduction of, and popularization of, new types of, and improvements in existing, communication systems. As a result of such improvements, new types of communications, requiring high data throughput rates, are possible. Digital communication techniques, for instance, are increasingly utilized in communication systems to efficiently communicate digital data, and the use of such techniques has facilitated the increased data throughput rates.

Digital voice communications, for instance, are exemplary of new types of communications permitted as a result of the improvements in communication technologies. Voice-Over-Internet Protocol (VOIP) communications form a type of digital voice communications. In VOIP communications, voice data is digitized and packetized into data packets prior to communication by a sending station upon a communication channel to a receiving station. Because of the packetized nature of the voice data, individual packets can be communicated upon the communication channel at discrete intervals. Once received at the receiving station, the data packets are concatenated together, thereby to permit recreation of the transmitted voice data.

With the popularization of the Internet and communication thereon, the Internet backbone has been utilized to form the communication channel upon which the data packets are communicated between a sending station and a receiving station. Telephonic communication effectuated in this manner is sometimes referred to as Internet telephony. Each packet of data into which the voice data is formatted includes a header portion which contains header information. Such header information includes, for instance, IP, UDP, and RTP information utilized to identify to where the packet is to be directed and to provide a time stamp with the packet. The informational part of the packet of data is referred to as the payload portion of the packet. The payload portion is appended to the header portion of the packet.

Packets communicated upon the Internet backbone, or other appropriate packet data network, are generally communicated upon available communication paths. Different packets of data might well be communicated upon different communication paths which have associated therewith differing path lengths or otherwise have differing delay periods between the sending and receiving stations. And, as a result of increased usage of conventional packet data networks, the delay times associated with the communication of packets of data between a sending and a receiving station can sometimes be significant. Congestion is sometimes said to occur when communication paths become clogged with packets of data to reduce the timeliness of their delivery to the receiving station. The congestion, and corresponding delay, disrupt communication quality of voice communications.

When a congestion condition dissipates, data packets, previously prevented from their delivery to the receiving station, are delivered in large numbers to the receiving station. That is to say, data packets are delivered to the receiving station in a surge, referred to as a surge condition. The deterioration of communication quality levels resulting therefrom is readily discernible by a user of the receiving station merely by listening to the resultant voice data once transduced into aural form.

Additionally, VOIP communication exhibits a jitter. Jitter also interferes with communication quality levels of the voice data.

Conventional efforts by which to compensate for the jitter include the use of a jitter buffer at a receiving station. The jitter buffer is generally of a buffer size which generally corresponds to the amount of delay exhibited in the transmission of the voice data to the receiving station. However, because the delay exhibited is variable, matching the size of the jitter buffer to the amount of delay is problematical. In the event that the jitter buffer is of a small buffer size, lessened amount of delay time results during pendency of the packets of data in the jitter buffer. But, if delay of the packets of data upon the communication paths is significant, a small buffer size is inadequate to buffer the data when finally received at the receiving station. Data overflowing from the buffer is generally discarded, thereby resulting in the loss of the informational content of the data and corresponding diminution of communication quality.

If, conversely, the buffer size is selected to be relatively large, voice quality is improved as the buffer is less likely to overflow, resulting loss of the data. But, by increasing the size of the jitter buffer, the corresponding delay is increased, in turn also resulting in a reduced communication quality level.

If a better manner could be provided by which to compensate for variable delays of the communication data in a packet data communication system, improved communication quality would be possible.

It is in light of this background information related to the communication of packet data that the significant improvements of the present invention have evolved.

SUMMARY OF THE INVENTION

The present invention, accordingly, advantageously provides apparatus, and an associated method, by which better to communicate data in a packet communication system.

Through operation of an embodiment of the present invention, a manner is provided by which to compensate for variable delays by which the packet data is delayed during communication of the data upon a communication path to a receiving station. Better compensation is made, through operation of an embodiment of the present invention, for surges of data received at a receiving station subsequent to a network congestion condition. Operation of an embodiment of the present invention is simply implemented and requires substantially less processing power in contrast to conventional compensation manners which require checking of the content of successive frames and performing jitter management operations upon the successive frames.

In one aspect of the present invention, a jitter buffer of relatively small buffer size is provided. The jitter buffer is of a size, for instance, to permit 50 ms of data packets to be buffered thereat. During a selected time period, earliest-received data packets, received during the selected time period, are buffered at the jitter buffer. The size of the jitter buffer is selected so that minimal delay is exhibited at the receiving station as a result of the buffering of the data.

In another aspect of the present invention, a trimming buffer is provided, also for buffering data packets thereat. The trimming buffer is of a size selected to permit buffering thereat of data packets received at a receiving station during a surge of data subsequent to a network congestion situation on a network upon which data is communicated to the receiving station. The trimming buffer is selected, for instance, to be of a buffer size to permit storage of data received during a 350 ms time period to be buffered at the trimming buffer. By selecting the buffer size of the trimming buffer to be of a great enough size, data packets arriving at the receiving station during a surge of data, subsequent to a congestion condition insures that data packets are not lost due to buffer overflow at the receiving station.

In another aspect of the present invention, a trimmer is provided for selectably trimming portions of the data buffered at the trimming buffer. The trimmer is operable in a manner to reduce the amount of data stored at the buffer but in a manner which maintains an acceptable audio quality of the data when converted back into voice data. In an exemplary implementation, the trimmer is operable to trim 50-ms segments of data out of the trimming buffer, thereby to reduce the amount of data stored thereat. Subsequent to the trimming of the segment of data, a subsequent 100 ms segment of data is not trimmed. If additional data remains in the trimming buffer subsequent to the 100 ms segment, the succeeding 50-ms segment of the data is then trimmed. Thereby, data packets of 250 ms of duration buffered at the trimming buffer are reduced in length to 150 ms durations. While the trimmed portions of the data are discarded, the informational content of the remaining portions of the data can still be utilized to generate a voice signal of a quality level permitting a user to understand the information content thereof.

In one implementation, a receiving station operable to receive VOIP (Voice-Over-Internet Protocol) data in an Internet telephony station includes apparatus by which to compensate for delay in an IP sound packet buffer. Data packets transmitted to the Internet telephony station are transmitted upon a packet data network backbone, such as the Internet backbone. The backbone is susceptible to congestion conditions and subsequent surge conditions in which large numbers of data packets are received at the Internet telephony station in a short period of time. A first set of data packets received at the station are buffered at a jitter buffer and subsequent data packets received at the station are buffered at a trimming buffer. The trimming algorithm is executed to selectably trim portions of the data stored at the trimming buffer. The data buffered at the jitter buffer is combined together with the remaining portions of the data buffered at the trimming buffer, and such data is thereafter utilized to recreate a voice signal for a user of the Internet telephony station.

In these and other aspects, therefore, apparatus, and an associated method, is provided for a receiving station operable to receive data packets transmitted thereto upon a channel. The channel exhibits variable delays in transmission of the data packets upon the channel. Compensation is made for the variable delays introduced upon the data packets during transmission to the receiving station. A first data packet buffer is coupled to receive a first set of the data packets received at the receiving station. The first data packet buffer buffers thereat the first set of the data packets. A second data packet buffer is coupled to receive a second set of the data packets received at the receiving station. The second data packet buffer buffers thereat the second set of the data packets. A data packet trimmer is coupled to access the second set of the data packets once received at the second data packet buffer. The data packet trimmer selectably trims selected data packets of the second set of data packets. Remaining ones of the data packets of the second set of data packets are concatenated to the data packets of the first set to form a resultant data packet set. The selected data packets trimmed by the data packet trimmer are trimmed such that the resultant data packet set is of a size within a selected set-size.

A more complete appreciation of the present invention and the scope thereof can be obtained from the accompanying drawings which are briefly summarized below, the following detailed description of the presently preferred embodiment of the invention, and the appended claims.

BRIEF DESCRIPTION OF THE DRAWING

FIG. 2 illustrates a representation of an exemplary representation of a timeline of data received at the receiving station shown in FIG. 1.

FIG. 3 illustrates a representation of a timeline, similar to that shown in FIG. 2, but here of the data, received at the receiving station shown in FIG. 1, subsequent to operation thereon by the apparatus of an embodiment of the present invention.

FIG. 4 illustrates portions of the receiving station shown in FIG. 1.

DETAILED DESCRIPTION OF THE PREFERRED EMBODIMENT

Figure 1:
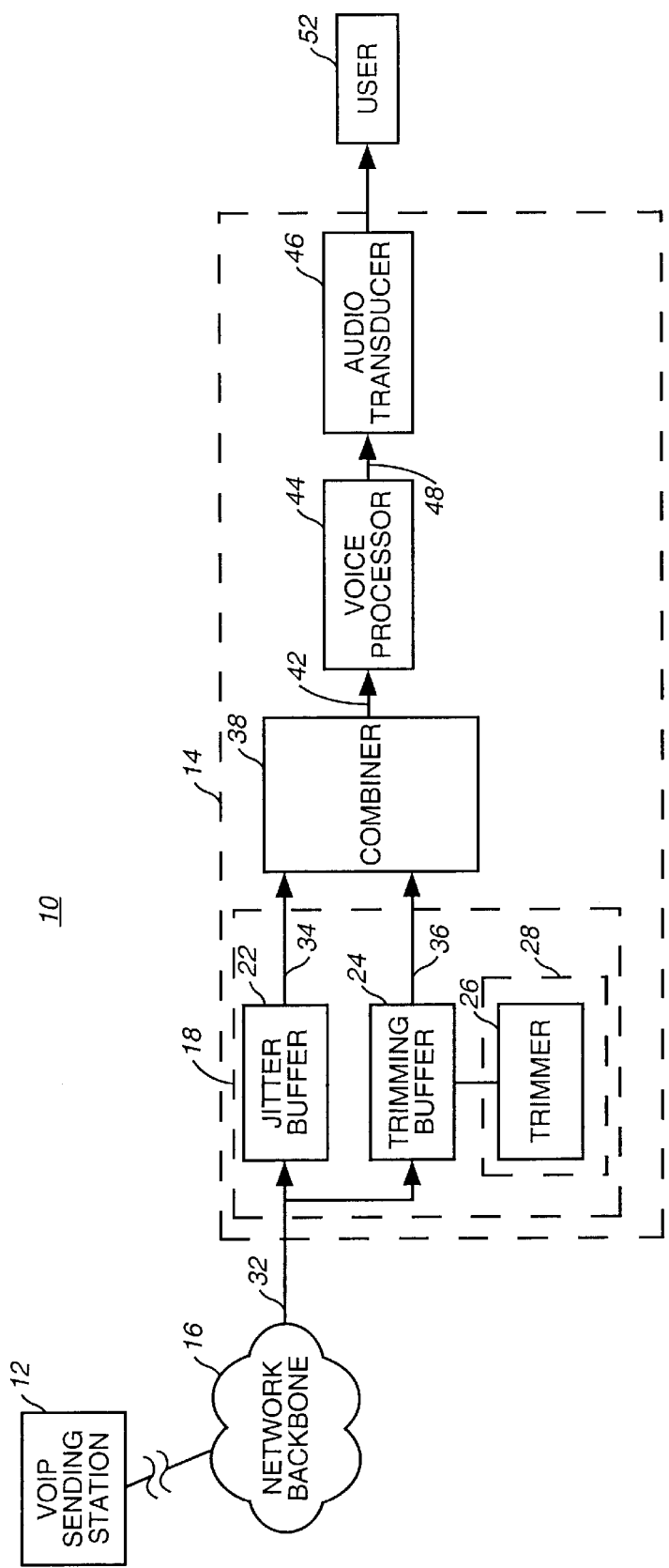
FIG. 1 illustrates a functional block diagram of a packet communication system including a receiving station in which an embodiment of the present invention is operable.

Referring first to FIG. 1, a packet data communication system, shown generally at 10, provides for communication of packet-based data between a sending station 12 and a receiving station 14. The sending and receiving stations are connected by way of a packet data network, here an Internet backbone 16. In the exemplary implementation, the packet data communication system is operable to effectuate Internet telephony. During an Internet telephony communication session, voice data generated at the sending station 12 is communicated by way of the network backbone 16 to be received at the receiving station 14. While operation of the exemplary embodiment of the present invention shall be described with respect to the Internet telephony implementation shown in FIG. 1, an embodiment of the present invention is also analogously operable in other implementations.

The sending station 12 forms, or includes, an IP (Internet Protocol) voice packet generator which generates IP voice packets which contain voice data. Packets are transmitted by the sending station upon the network backbone 16. Indicia contained in individual ones of the packets identify the identity of the desired destination of the packets, here the receiving station 14. Network backbone apparatus route the packets to the receiving station.

In contrast to a circuit-switched connection, communication paths of the packets of data between the sending station and the receiving station upon the network backbone are not dedicated to a particular communication session. Communication paths through the network backbone are, instead, shared paths and the packets are routed through the network backbone on an availability basis. While the available bandwidth upon the network backbone is increased by sharing the available resources, the network backbone is susceptible to congestion conditions. That is to say, if too much data is to be routed upon the network backbone, delays in communication of packets of data between a sending station and a receiving station sometimes result. As the congestion situation dissipates, a surge of data packets is routed to, and delivered to, the receiving station. As noted above, conventional receiving stations either are unable to compensate for the data surge or introduce significant delay times into processing of the data, thereby also effecting communication quality.

The receiving station 14 shown in FIG. 1 includes apparatus 18 of an embodiment of the present invention. The apparatus facilitates compensation for data surges resulting, e.g., subsequent to a dissipation of a congestion condition. By better compensating for the surge of data, improved levels of communication quality are possible through use of the apparatus 18 as a portion of the receiving station.

The apparatus 18 is here shown to include a jitter buffer 22, a trimming buffer 24, and a trimmer 26. In the exemplary implementation, the trimmer 26 forms a functional portion of a processing unit 28. Both the jitter and trimming buffers 22 and 24 are coupled to receive data packets received at the receiving station, here on the lines 32. And, the trimmer 26 is also operable to perform trimming operations upon data, once stored at the trimming buffer 24.

The jitter and trimming buffers are coupled, here by way of the lines 34 and 36 to a combiner 38. Data stored at the jitter buffer is provided to the combiner 38 by way of the lines 34. And, data stored at the trimming buffer 24, subsequent to trimming operations performed thereupon by the trimmer 26, are provided to the combiner by way of the lines 36.

The combiner 38 is operable to combine the data provided thereto by way of the lines 34 and 36 to form a resultant data set. In the exemplary implementation, the combiner 38 concatenates the data stored at the trimming buffer to the data stored at the jitter buffer to form the resultant data set.

The combiner provides the resultant data set by way of the lines 42 to a voice processor 44 whereat voice processing operations are performed upon the data set. Thereafter, the data set is provided to an audio transducer 46, here by way of the lines 48 to be transduced into audio form. A user, indicated by the block 52, listening to the receiving station 14 is able to detect the audio signals generated by the transducer.

The apparatus 18 is operable pursuant to an embodiment of the present invention to buffer data in amounts which might occur in a surge of data to the receiving station without necessitating a significant delay which affects the audio quality of the signal, once transduced into audio form.

In operation, data is received at the receiving station, delivered thereto by way of the line 32. Earliest-received data packets, here, the data packets received within a first 50 ms time period are buffered at the jitter buffer 22. Subsequent data packets are buffered at the trimming buffer 24. The trimming buffer is here capable of storing data packets within a 350 ms time period. Thereby, data packets corresponding to a 400 ms time period are buffered at the buffers 22 and 24.

In contrast to conventional systems in which only a single buffer is utilized, when data packets are received pursuant to a surge condition subsequent to dissipation of a congestion condition, buffer overflow is less likely to result due to the size of the trimming buffer. And, because the jitter buffer is of relatively small size, in the absence of a surge condition, little delay results from storing data packets initially at the jitter buffer.

The trimmer 26 is operable to trim, or otherwise delete, selected data packets buffered at the trimming buffer. That is to say, selected periods of speech of which the data packets are representative are cut, thereby to permit compression of remaining portions of the data packets buffered at the trimming buffer. When the data packets are combined at the combiner 38, and thereafter processed by the voice processor 44, the resultant voice quality of the data, when transduced by the transducer, is acceptable without an increase in delay times. Also, delay times can be decreased while still maintaining acceptable voice quality through conventional use of the jitter buffer in the absence of a surge condition.

The exemplary implementation of operation of the trimmer 26 is predicated upon experimental observation at removal of 50 ms portions at the trimming buffer does not unduly deleteriously affect voice quality if the edited portions of data packets are surrounded by unedited portions of the same lengths. While the disturbance to the voice quality might be noticeable, the informational content of the information remains detectable. Additional unedited portions surrounding the edited portion, such as 100 ms portions around each edited 50 ms portion, in contrast, further improves the voice quality of the data, once transduced into audio form.

In exemplary operation, and describing the buffers 22 and 24 with respect to a time period, here ms, rather than the related IP packet capacity, the jitter buffer is sized at 50 ms. And, as noted above, the trimming buffer 24 is of a 350 ms size. In a surge condition, trimming is performed by the trimmer 26 immediately upon overflow of the jitter buffer 22 with additional data packets being buffered at the trimming buffer 24.

FIG. 2 illustrates a time track, shown generally at 62, representative of an exemplary situation in which data is received at the receiving station. At time location 64, a 400 ms congestion period commences. During time period 66, a 50 ms portion of data is consumed from the jitter buffer 22. Thereafter, a 350 ms silent period 68 commences. In the absence of use of the trimming buffer 24, during the time period 72, additional data packets, received at the receiving station, overflow from the jitter buffer and are deleted. Such deletion deleteriously affects the communication quality of the communications between the sending and receiving stations. Finally, and as indicated subsequent to the time location 74, data is continued to be received at the receiving station.

FIG. 3 also illustrates a timeline, here shown generally at 82. The timeline 82 is representative of operation of the apparatus 18 pursuant to an embodiment of the present invention. Here, the trimming buffer 24 is utilized, together with the trimmer 26, to improve communication quality levels of communication during operation of the communication system. The same data sequence shown previously with respect to FIG. 2 again forms the timeline. That is to say, starting at point 64, during the time period 66, old data is consumed from the jitter buffer 22. Then, and as indicated at 68, a 350 ms silent period occurs. Here, subsequent segments are successively numbered at 83 and 84. Segments 83 indicate unedited data portions. And segments 84 indicate deleted portions, deleted through operation of the trimmer 26. Segments 86 are representative of 100 ms segments of unedited speech and segments 88 are representative again of 50 ms deleted portions of data trimmed by the trimmer 26.

FIG. 4 illustrates again the trimmer buffer 24 and jitter buffer 22, here shown to describe exemplary operation of an embodiment of the present invention. In an implementation in which the trimmer 26 forms an algorithm executable by the control circuitry 28, the algorithm is represented as follows:

Continuously: Delete all IP packets at point 110 if they are older than (real-time−400 ms).
Move rest of the packets right.
TRIM BEGIN: When a packet overflows left from the point 111, mark its time as TrimStart.
TRIM LOOP
Delete all packets to the left of point 111 if their time stamp is between trim start and (TrimStart+50 ms).
When there appears a first packet in the trimming buffer with a time stamp newer than (TrimStart+50 ms), assign TrimStart=(TrimStart+100 ms).
If there are no packets left from point 111, GOTO TRIM BEGIN
GOTO TRIM LOOP Through operation of the trimmer 26, evenly-spaced 50 ms slices 84 of the data buffered at the trimming buffer are deleted. Thereby, in the exemplary implementation, after a 400 ms period of congestion dissipates, the buffer contains speech information related to the last 400 ms period, but, subsequent to deletion of the portions of the data, the data is "played" in a 200 ms period. That is to say, the 200 ms period is formed of a 50 ms segment stored at the jitter buffer and 150 ms remaining at the trimming buffer. At the termination of the 200 ms period, all speech information from the congestion is played without significant voice quality deterioration. And, during this time, the buffer receives 200 ms real-time speech packets that are subject also to trimming operations. Thereafter, the delay is 200 ms in speech information but only 100 ms in real-time. Subsequent to 100 ms period, the previous data is sent and, while sending such data, only 50 ms of real-time packets are received. Thereafter, the delay returns to a 50 ms period.

In, for example, a VOIP system in which GSM (Global System for Mobile Communications) coding is utilized, the size of the jitter buffer can, for instance, be 60 ms, and the size of the trimming buffer can, for instance, be 340 ms. And, for instance, the example value of the trimming buffer can cause deletion of every third data packet. For example, in GSM, one speech frame is 20 ms (at the ETSI GSM full rate and the ETSI GSM enhanced full rate). This does not mean, though, that, in systems in which packet network (VOIP) is used between two time division networks, that jitter and trimmer buffer sizes must be multiples of the size of a VOIP frame. VOIP, e.g., RTP as in H.323, packets can contain several basic frames. Additionally, if a GSM codec is used and if there are two basic frames packed into one VOIP (RTP)-frame and the above-mentioned example values are used as the buffer sizes, the first and the first half of the second RTP-frame fit the jitter buffer, but the second half of the second frame and the next frames are directed to the trimmer buffer in a surge condition.

Figure 5:
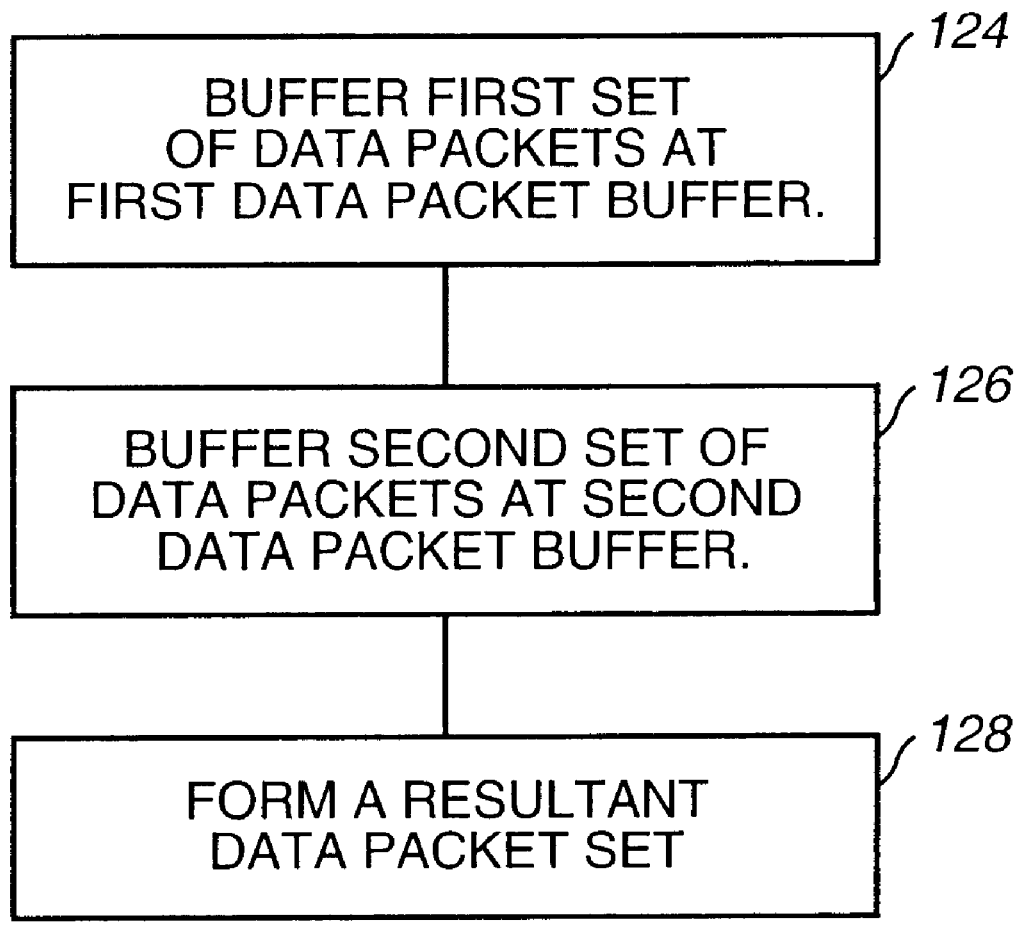
FIG. 5 illustrates a method flow diagram listing the method of operation of an embodiment of the present invention.

FIG. 5 illustrates a method, shown generally at 122, of the method of operation of an embodiment of the present invention. The method 122 is operable to compensate for variable delays introduced upon data packets during transmission upon a communication channel to a receiving station.

First, and as indicated by the block 124, a first set of the data packets received at the receiving station are buffered at a first data packet buffer. Then, and as indicated by the block 126, a second set of the data packets received at the receiving station are buffered at a second data packet buffer.

Thereafter, selected data packets of the second set of data packets are selectably trimmed. And, as indicated by the block 128, remaining ones of the data packets of the second set of data packets are concatenated to the data packets of the first set to form a resultant data packet set. The selected data packets are trimmed in a manner such that the resultant data packet set is of a size within a selected set-size.

Thereby, through operation of an embodiment of the present invention, a manner is provided by which to compensate for variable delays by which data is delayed during communication of the data upon a communication path to a receiving station.

The preferred descriptions are of preferred examples for implementing the invention, and the scope of the invention should not necessarily be limited by this description. The scope of the present invention is defined by the following claims.

We claim:

1. In a receiving station operable to receive data packets transmitted thereto upon a channel which exhibits variable delays in transmission of the data packets upon the channel, an improvement of apparatus for compensating for the variable delays introduced upon the data packets during transmission to the receiving station, said apparatus comprising:

a first data packet buffer coupled to receive a first set of the data packets received at the receiving station, said first data packet buffer being of a dynamically configurable buffer size for buffering thereat the first set of the data packets;

a second data packet buffer coupled to receive a second set of the data packets received at the receiving station, said second data packet buffer for buffering thereat the second set of the data packets;

a data packet trimmer coupled to access the second set of data packets once received at said second data packet buffer, said data packet trimmer for selectively trimming selected data packets of the second set of data packets, remaining ones of the data packets of the second set of data packets concatenated to the data packets of the first set to form a resultant data packet set, the selected data packets trimmed by said data packets trimmer trimmed such that the resultant data packet set is of a size within a selected set size, wherein the data packets of which the receiving station is operable to receive are coded into encoded form by a coder prior to transmission to the receiving station, the coder exhibiting a coder characteristic and wherein the buffer size into which said first data packet buffer is confined is related to the coder characteristic.

2. The apparatus of claim 1 wherein the data packets transmitted to the receiving station are transmitted pursuant to a packet-based voice communication service, and wherein the data packets of the first set of data packets comprise, within a selected time period, data packets earliest received at the receiving station.

3. The apparatus of claim 2 wherein the data packets earliest-received at the receiving station and buffered at said first data packet buffer are received at the receiving station during a first portion of the selected time period.

4. The apparatus of claim 3 wherein the data packets of the second set of data packets buffered at said second data packet buffer are received at the receiving station during a second portion of the selected time period, the second portion of the selected time period subsequent to the first portion thereof.

5. The apparatus or claim 1 wherein the selected data packets trimmed by said data packet trimmer trim data packets at selected intervals to reduce numbers of data packets of the second set of data packets such that the resultant data packet set is within the selected set-size.

6. The apparatus of claim 5 wherein the selected intervals at which said data packet trimmer trims the selected data packets comprise periodic intervals.

7. The apparatus of claim 5 wherein said data packet trimmer trims data packets received at the receiving station within selected time windows at the selected intervals.

8. The apparatus of claim 7 wherein sizes of the selected time windows within which said data packet trimmer trims the data packets are dynamically configurable.

9. The apparatus of claim 1 wherein said second packet data buffer is of a dynamically configurable buffer size.

10. The apparatus of claim 9 wherein the data packets of which the receiving station is operable to receive are coded into encoded form by a coder prior to transmission to the receiving station, the coder exhibiting a coder characteristic and wherein the buffer size into which said second data packet buffer is configured is related to the coder characteristic.

11. The apparats of claim 10 wherein said first data packet buffer is further configured into a buffer size related to the to the coder characteristic.

12. The apparatus of claim 1 wherein the receiving station is operable at a selected quality of service level and wherein said first data packet buffer and said second data packet buffer are of sizes responsive to the selected quality of service level.

13. In a method for receiving data packets at a receiving station transmitted thereto upon a channel which exhibits-variable delays in transmission of the data packets upon the channel, an improvement of a method for compensating for the variable delays introduced upon the data packets during transmission to the receiving station, said method comprising:

buffering a first set of the data packets received at the receiving station at a first data packet buffer of a dynamically configurable buffer size;

buffering a second set of the data packets received at the receiving station at a second data packet buffer;

selectively trimming selected data packets of the second set of data packets;

concatenating remaining ones of the data packets of the second set of data packets to the data packets of the first set to form a resultant data packet set, the selected data packets trimmed during said operation of trimming such that the resultant data packet set is of a size within a selected set-size;

wherein the data packets of which the receiving station is operable to receive are coded into encoded form by a coder prior to transmission to the receiving station, the coder exhibiting a coder characteristic and wherein the buffer size into which said first data packet buffer is configured is related to the coder characteristic.

14. The method of claim 13 wherein the data packets transmitted to the receiving station are transmitted pursuant to a packet-based voice communication service, and wherein the data packets of the first set of data packets buffered during said first operation of buffering comprise, within a selected time period, data packets earliest-received at the receiving station.

15. The method of claim 13 wherein said operation of trimming comprises trimming data packets at selected intervals to reduce numbers of data packets of the second set of data packets such that the resultant data packet set is within the selected set-size.

16. The method of claim 15 wherein the selected intervals at which the data packets of the second set are trimmed comprise periodic intervals.

17. The method of claim 15 wherein the data packets trimmed during said operation of trimming comprise data packets received at the receiving station within selected time windows at the selected intervals.

18. The method of claim 17 further comprising the operation of selecting sizes of the time windows.

* * * * *